United States Patent
Oguri et al.

(10) Patent No.: US 8,092,134 B2
(45) Date of Patent: *Jan. 10, 2012

(54) FASTENER

(75) Inventors: Kazuyuki Oguri, Nagoya (JP); Yuichiro Kamino, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/227,642

(22) PCT Filed: Jun. 11, 2007

(86) PCT No.: PCT/JP2007/061755
§ 371 (c)(1),
(2), (4) Date: Nov. 24, 2008

(87) PCT Pub. No.: WO2007/142354
PCT Pub. Date: Dec. 13, 2007

(65) Prior Publication Data
US 2009/0173828 A1    Jul. 9, 2009

(30) Foreign Application Priority Data
Jun. 9, 2006    (JP) .................................. 2006-161273

(51) Int. Cl.
*F16B 37/14*    (2006.01)
(52) U.S. Cl. ....................... 411/372.5; 361/218; 244/1 A
(58) Field of Classification Search ............... 411/372.5, 411/914, 372.6, 908, 373, 377; 244/1 A; 361/212, 216–218
See application file for complete search history.

(56) References Cited

U.S. PATENT DOCUMENTS

| | | | | |
|---|---|---|---|---|
| 3,122,051 | A * | 2/1964 | Greene | 411/373 |
| 4,479,163 | A * | 10/1984 | Bannink et al. | 361/218 |
| 4,502,092 | A * | 2/1985 | Bannink et al. | 361/218 |
| 4,628,402 | A * | 12/1986 | Covey | 361/218 |
| 4,630,168 | A * | 12/1986 | Hunt | 361/218 |
| 4,760,493 | A * | 7/1988 | Pearson | 361/218 |
| 4,900,206 | A * | 2/1990 | Kazino et al. | 411/377 |
| 4,979,281 | A * | 12/1990 | Smith et al. | 29/525.11 |
| 5,845,872 | A * | 12/1998 | Pridham et al. | 244/1 A |
| 6,302,630 | B1 * | 10/2001 | Grant | 411/372.6 |
| 7,050,286 | B2 * | 5/2006 | Pridham et al. | 361/218 |
| 7,277,266 | B1 * | 10/2007 | Le et al. | 361/218 |

(Continued)

FOREIGN PATENT DOCUMENTS

EP    0 685 389    12/1995

(Continued)

OTHER PUBLICATIONS

International Search Report mailed Jul. 17, 2007 for International Application No. PCT/JP2007/061755.

(Continued)

*Primary Examiner* — Gary Estremsky
(74) *Attorney, Agent, or Firm* — Wenderoth, Lind & Ponack, L.L.P.

(57) ABSTRACT

A fastener, of which severe strength is demanded and which can also be applied to a location, in which a flush surface equipment is taken into consideration, and which can be manufactured readily and quickly and reduced in manufacturing cost, is provided. A fastener (1) joins a skin of an airplane and a structural material positioned inside the skin and one end surface of a flush head (3) is covered by an insulator layer (5).

18 Claims, 4 Drawing Sheets

U.S. PATENT DOCUMENTS

| | | | |
|---|---|---|---|
| 7,740,434 B2 * | 6/2010 | Kamino et al. | 411/372.5 |
| 2005/0011441 A1 | 1/2005 | Kannan | |

FOREIGN PATENT DOCUMENTS

| | | |
|---|---|---|
| EP | 2 184 227 | 5/2010 |
| JP | 54-54771 | 4/1979 |
| JP | 63-101313 | 7/1988 |
| JP | 3-18045 | 3/1991 |
| JP | 2612276 | 2/1997 |
| JP | 2003-306772 | 10/2003 |
| JP | 2004-107658 | 4/2004 |
| JP | 2005-293948 | 10/2005 |

OTHER PUBLICATIONS

European Search Report issued Jul. 4, 2011 in European Patent Application No. 07 745 044.3, which is a foreign counterpart of the present application.

* cited by examiner

FASTENER

TECHNICAL FIELD

The present invention relates to a fastener used when a resin material having conductivity (for example, CFRP (carbon fiber reinforced resin)) is used as a skin of an airplane, and more particular, to a thunder resistant fastener.

BACKGROUND ART

As a fastener used when a resin material having conductivity is used as a skin of an airplane, there is known one (see, for example, Patent Citation 1), of which a flush head and a shank are wholly covered by an insulating material.

Patent Citation 1:
The Publication of U.S. Pat. No. 4,760,493

DISCLOSURE SUMMARY OF INVENTION

With the fastener disclosed in the Citation, however, it is necessary to wholly cover the flush head and the shank with an insulating material, so that there is caused a problem in that the fastener cannot be manufactured readily and quickly and is increased in manufacturing cost.

Also, since the fastener disclosed in the Citation is structured such that an insulated portion thereof becomes bulky, it also involves a problem that the fastener cannot be applied to an airframe skin and a wing surface, of which a strict requirement is demanded in terms of strength design, in the case of taking a flush surface equipment of small air resistance into consideration.

The present invention has been thought of in view of the situation and has its object to provide a fastener, of which severe strength is demanded and which can also be applied to a location, in which a flush surface equipment is taken into consideration, and which can be manufactured readily and quickly and reduced in manufacturing cost.

The present invention adopts the following solutions in order to solve the above problems.

A fastener according to the invention joins a skin of an airplane and a structural material positioned inside the skin, one end surface of a flush head being covered by an insulator layer.

The fastener according to the invention can be manufactured readily and quickly and it is possible to achieve reduction in manufacturing cost since the insulator layer is formed (applied) only on one end surface of the flush head.

Also, with the fastener according to the invention, one end surface of the flush head is covered by the insulator layer, so that even if lightning strikes directly against a member (made of, for example, copper, GFRP (glass fiber reinforced resin), etc.) that constitutes a skin of an airplane and is conductive, the insulator layer can interrupt a lightning stroke current tending to flow toward the fastener body.

Further, when the fastener according to the invention is assembled (joined) into a skin of an airplane, the insulator layer is formed on that exposed surface (that is, one end surface of the flush head) of the fastener, which is exposed (appears) to a surface of the skin, so that it is possible to prevent lightning from striking directly against the fastener.

With the fastener, it is preferable that the insulator layer is an insulating material that exhibits 100 kV/mm or more in terms of a value of dielectric breakdown voltage, and in particular, it is further preferable that the insulator layer is composed of one of biaxial oriented polyethylene terephthalate (PET) film, polyimide film, biaxial oriented polyethylene naphthalate (PEN) film, polyphenylene sulfide (PPS) film and biaxial oriented polypropylene film having a high dielectric strength.

With such fastener, it is possible to considerably decrease the insulator layer in thickness, so that it is possible to considerably decrease the weight of one fastener.

With the fastener, it is further preferable that the insulator layer is fixed to the flush head through an adhesive.

With such fastener, the insulator layer is fixed to the flush head through an adhesive (for example, an epoxy adhesive), so that the fastener can be manufactured readily and quickly and reduced in manufacturing cost.

With the fastener, it is further preferable that the insulator layer is formed by thermal spraying or a coating baking method.

With such fastener, the insulator layer is formed by thermal spraying or a coating baking method, so that the fastener can be manufactured readily and quickly and reduced in manufacturing cost.

An airplane assembly according to the invention comprises a skin, of which a main element is made of a resin material having conductivity, a structural material that supports the skin from inside, and a fastener that joins the skin and the structural material, and the fastener comprises any one of the fasteners described above.

With the airplane assembly according to the invention, a lightning stroke current tending to flow toward the fastener body is interrupted (decreased) by the insulator layer, so that it is possible to prevent (decrease) conduction of the lightning stroke current to the resin material having conductivity, thus enabling preventing the lightning stroke current from doing damage to the resin material having conductivity.

Also, since a lightning stroke current does not flow toward the fastener body, so that it is possible to dispense with all DIs (Dielectric Insulator), which are conventionally needed between a structural material and a collar of a fastener, and all caps made of insulating rubber and mounted to cover tip ends of male thread portions of the fasteners and the collars of the fasteners (mounted to prevent streamer secondarily discharged from the collars), thus enabling considerably decreasing an airframe weight.

In addition, a resin material referred to herein includes fiber reinforced resin materials such as CFRP (carbon fiber reinforced resin), etc.

With the airplane assembly described above, a member having conductivity is preferably laminated on an outer surface of the resin material having conductivity.

With such airplane assembly, even if lightning strikes directly against a member that constitutes a skin of an airplane and is conductive, it is possible to prevent (decrease) a lightning stroke current from entering the fastener body since the lightning stroke current flows through the member having conductivity.

In addition, a resin material referred to herein includes fiber reinforced resin materials such as CFRP (carbon fiber reinforced resin), etc.

The fastener according to the invention produces an effect that it can be applied to a location, of which severe strength is demanded and in which a flush surface equipment is taken into consideration, and it can be manufactured readily and quickly and reduced in manufacturing cost.

EXPLANATION OF REFERENCE

Figure 1:
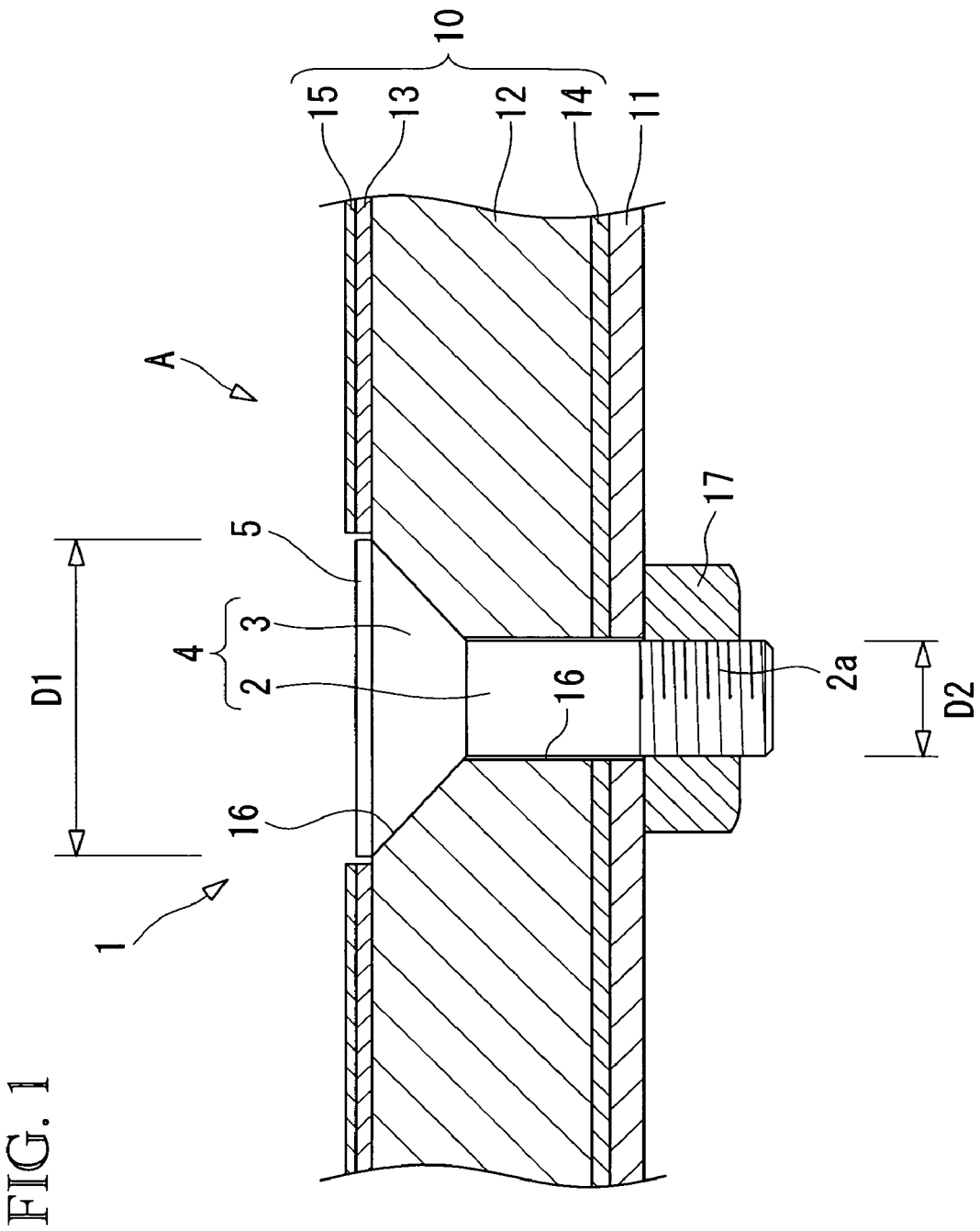
FIG. 1 is a view showing an embodiment of a fastener according to the invention and a longitudinal, cross sectional view showing an airplane assembly in a state, in which a skin and a structural material are joined by the fastener.

1: fastener
3: flush head
5: insulator layer
10: skin
11: structural material
12: CFRP (resin material having conductivity)
15: conductive mesh (member having conductivity)
A: airplane assembly

BEST MODE FOR CARRYING OUT DETAILED DESCRIPTION OF THE INVENTION

An embodiment of a thunder resistant fastener according to the invention will be described below with reference to the drawings.

As shown in FIG. 1, a thunder resistant fastener 1 (referred below to as fastener) according to the embodiment comprises, as main components, a fastener body 4 including a columnar-shaped shank 2 and a flush head 3 (i.e., a fastener head) in the form of a substantially truncated cone provided on one end side of the shank 2 to increase in diameter as it goes away from the shank 2, and an insulator layer 5 arranged to cover one end surface (upper end surface in FIG. 1) of the flush head 3.

The fastener body 4 is formed integrally from the shank 2 and the flush head 3 and fabricated using an alloy such as titanium (Ti-6Al-4V: annealed material), inconel, or the like.

A male thread portion $2a$ being threaded into a female thread portion of a collar (nut) described later is formed at the other end (lower end in FIG. 1) of the shank 2.

The flush head 3 is formed to be sized so that an outside diameter D1 thereof is in the order of, for example, 2 times or more an outside diameter D2 of the shank 2.

The insulator layer 5 is a disk-shaped member formed to be sized so that an outside diameter thereof is equal to (or substantially equal to) the outside diameter D1 of the flush head 3, and is fabricated using, for example, GFRP (glass fiber reinforced resin). The insulator layer 5 has a plate thickness of, for example, 1.0 mm and a sufficient dielectric strength to withstand a lightning stroke test voltage (about 40 kV) of MIL-STD-1757A Zone 1. In the case of using GFRP for the insulator layer 5, the dielectric strength of GFRP is 40 kV/mm even when an estimate is made on the safety side, so that a sufficient dielectric strength is provided with a plate thickness of 1.0 mm even when exposed to a lightning stroke test voltage (about 40 kV) of MIL-STD-1757A Zone 1.

The fastener 1 described above is manufactured in the following procedure.

(1) Glass cloth before curing (a pre-preg state) is laminated to be subjected to impregnation with the use of an epoxy resin, and then heated and cured to manufacture an insulator layer 5.

(2) A fastener body 4, of which a shank 2 is formed at the other end thereof with a male thread portion $2a$ is prepared and shot material particles (hard particles made of, for example, metal, ceramics, glass, or the like and having an average particle size of 200 μm or less (more specifically, at least 10 μm and at most 100 μm)) are projected on one end surface (surface) of a flush head 3 to perform a pretreatment (such treatment is referred to as shot blasting) to roughen the surface of the flush head 3.

In addition, it is possible to roughen the surface of the flush head 3 using sand paper or the like in place of shot blasting.

(3) After an adhesive (epoxy adhesive, for example, epoxy adhesive EA9396 manufactured by Hysol-Dexter Ltd.) is applied on one end surface of the flush head 3, an insulator layer 5 is put thereon and the adhesive is cured to fix the insulator layer 5 to the flush head 3.

The fastener 1 manufactured in this manner is used to join, for example, a skin 10 of an airplane shown in FIG. 1 and a structural material (for example, rib, stringer, or the like) 11. In addition, the skin 10 and the structural material 11 are joined by the fastener 1 to provide an airplane assembly (for example, wing assembly, tail assembly, fuselage assembly, or the like) A.

The skin 10 is mainly made of a resin material (for example, CFRP (carbon fiber reinforced resin) referred below to as "CFRP") 12 having conductivity (conductivity in the order of $1/100$ to $1/1000$ times that of aluminum) and resin materials (for example, GFRP (glass fiber reinforced resin) referred below to as "GFRP") 13, 14 having an insulating property are laminated on a whole surface (surface positioned outside after assembling) and the whole of a back surface (surface positioned inside after assembling).

Also, a meshy (or plate-shaped) member (made of, for example, copper and referred below to as "conductive mesh") 15 being conductive as a whole is laminated on a surface (surface positioned outside after assembling) of the GFRP 13 positioned on a surface side of the CFRP 12.

The structural material 11 is made of, for example, aluminum alloy, titanium material, or CFRP (carbon fiber reinforced resin) and arranged in a predetermined position on a back surface (the surface positioned inside after assembling) of the GFRP 14.

Recesses (holes) 16 extending through the skin 10 and the structural material 11 and enabling receiving the fasteners 1 therein are formed in predetermined positions on a structure, of which the structural material 11 is arranged on the back surface of the GFRP 14. The fasteners 1 are received in the respective recesses 16 and collars (nuts) 17 fabricated using, for example, titanium, inconel, or the like are clamped onto the male thread portions $2a$ projecting inwardly from a back surface of the structural material 11.

Since the insulator layer 5 is arranged on one end surface of the flush head 3 of the fastener 1 according to the embodiment, it is possible to interrupt a lightning stroke current tending to flow toward the fastener body 4 even when lightning strikes directly against the insulator layer 5.

Also, the insulator layer 5 is fixed to the flush head 3 through an adhesive and the fastener 1 can be manufactured readily and quickly, so that it is possible to achieve reduction in manufacturing cost.

Further, since that pretreatment, by which the surface of the flush head 3 is roughened, is applied to the surface, it is possible to surely (firmly) fix the insulator layer 5 to the flush head 3, to surely prevent the insulator layer 5 from peeling off the flush head 3 during the running of an airplane, and to maintain the fastener 1 in a favorable state.

Furthermore, in the case where the fastener 1 according to the embodiment is used to join, for example, the skin 10 and the structural material (for example, rib, stringer, or the like) 11 of an airplane shown in FIG. 1, a lightning stroke current tending to flow toward the fastener body 4 is interrupted (decreased) by the insulator layer 5, so that it is possible to prevent (decrease) conduction of the lightning stroke current to the CFRP 12, thus enabling preventing the lightning stroke current from doing damage to the CFRP 12.

Furthermore, with the fastener 1 according to the embodiment, a lightning stroke current does not flow toward the fastener body 4, so that it is possible to dispense with all DIs (Dielectric Insulator), which are conventionally needed between the structural material 11 and the collar 17 to prevent sparkover, and all caps made of insulating rubber and mounted to wholly cover tip ends of the male thread portions 2a and the collars 17 (mounted to prevent streamer secondarily discharged from the collars 17), thus enabling considerably decreasing an airframe weight.

In addition, the invention is not limited to the embodiment described above but PET (for example, Lumirror manufactured by TORAY Ltd.) having a plate thickness of 125 μm can be adopted as an insulator layer 5 in place of the insulator layer 5 made of GFRP composite material.

In this manner, by using PET for the insulator layer 5, it is possible to considerably decrease the thickness of the insulator layer 5 and to considerably decrease the weight of one fastener.

In addition, while the dielectric breakdown voltage of GFRP is about 40 kV/mm, the dielectric breakdown voltage of PET (biaxial oriented polyethylene terephthalate) is about 300 kV/mm.

Also, in case of using Lumirror manufactured by TORAY Ltd. for the insulator layer 5, its thickness is preferably any one of 100 μm, 125 μm, 188 μm, 210 μm, and 250 μm.

Further, polyimide (kapton) having a thickness of 125 μm can be adopted for an insulator layer 5 in place of the insulator layer 5 made of GFRP composite material.

In this manner, by using polyimide for the insulator layer 5, it is possible to considerably decrease the thickness of the insulator layer 5 and to considerably decrease the weight of one fastener.

In addition, while the dielectric breakdown voltage of GFRP is about 40 kV/mm, the dielectric breakdown voltage of polyimide is about 300 kV/mm.

Also, in case of using polyimide for the insulator layer 5, it is possible to fix the insulator layer to the flush head 3 by virtue of heat sealing with the use of a polyimide layer instead of using the epoxy adhesive (for example, epoxy adhesive EA9396 manufactured by Hysol-Dexter Ltd.) described above.

Furthermore, biaxial oriented polyethylene terephthalate (PEN) (for example, Teonex manufactured by TEIJIN Ltd.) having a plate thickness of 125 μm can be adopted for the insulator layer 5 in place of the insulator layer 5 made of GFRP composite material.

In this manner, by using PEN for the insulator layer 5, it is possible to considerably decrease the thickness of the insulator layer 5 and to considerably decrease the weight of one fastener.

In addition, while the dielectric breakdown voltage of GFRP is about 40 kV/mm, the dielectric breakdown voltage of PEN (biaxial oriented polyethylene terephthalate film) is about 300 kV/mm to 400 kV/mm.

Also, in the case of using Teonex polyimide manufactured by TEIJIN Ltd. for the insulator layer 5, its thickness is preferably any one of 75 μm, 100 μm, 125 μm, 188 μm, and 250 μm.

Furthermore, instead of bonding (heat sealing) the insulator layer 5 to the surface of the flush head 3, it is possible to use thermal spraying (for example, plasma thermal spraying, arc thermal spraying, HVOF thermal spraying, etc.) to form the insulator layer 5 on the surface of the flush head 3.

Specifically, thermal spraying of alumina insulator layer onto the surface of the flush head 3 is performed.

In addition, the insulator layer 5 is not limited to alumina and sealing with impregnation of a silicone solution and a polyimide solution is performed to enable improving the insulating property since coating with thermal spraying is poor in insulating property due to existing vacancy.

Furthermore, instead of bonding (heat sealing) the insulator layer 5 to the surface of the flush head 3, it is possible to use the coating baking method to form the insulator layer 5 on the surface of the flush head 3.

Specifically, a polyimide varnish (solution), for example, a polyimide varnish (U-varnish) manufactured by UBE KOUSAN Ltd. is used to coat polyimide on the surface of the flush head 3 through coating/drying/baking.

In addition, in order to increase the thickness of a polyimide layer, it suffices to repeatedly perform the processes of coating/drying/baking.

Figure 2:
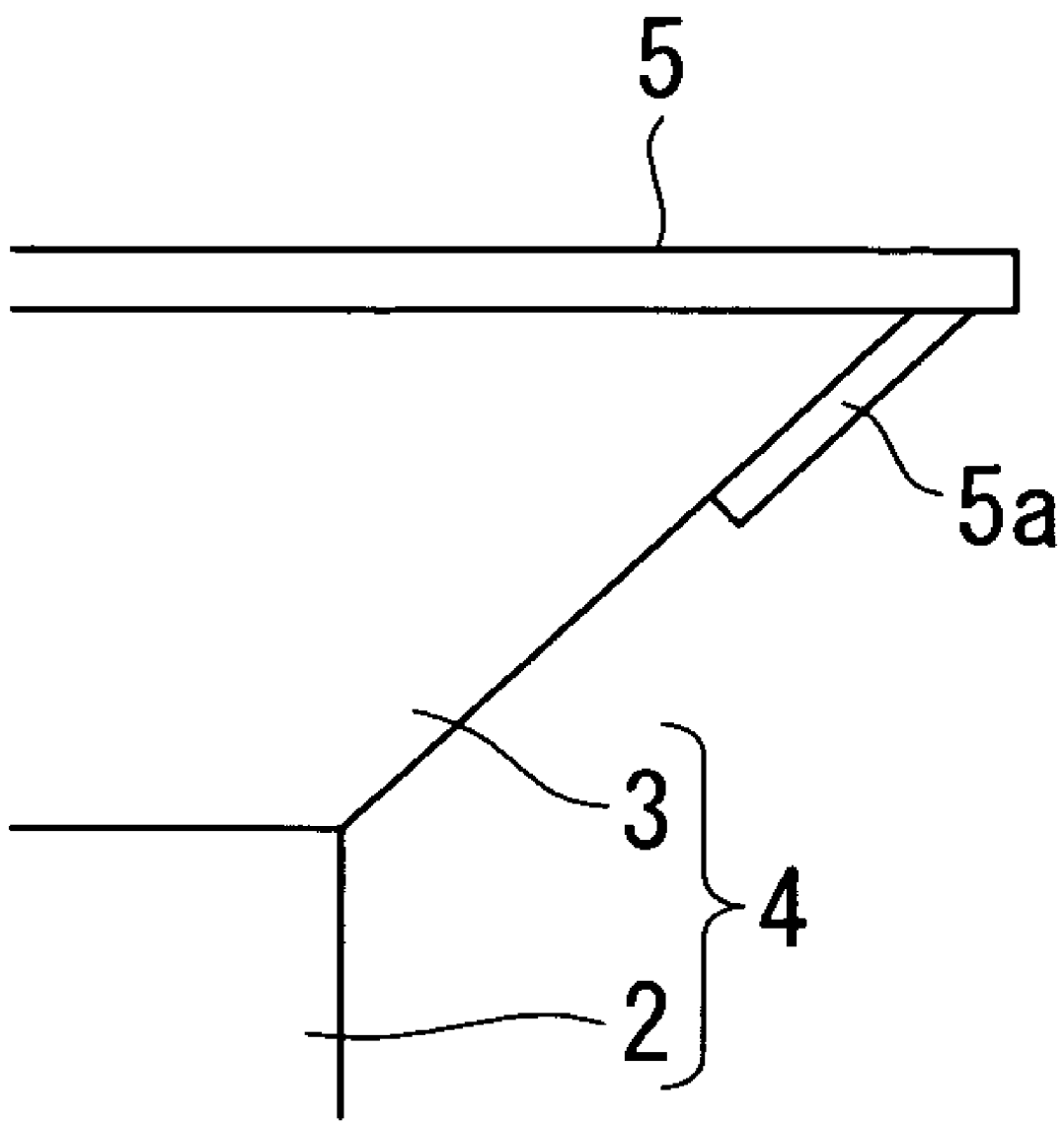
FIG. 2 is a cross sectional view showing, in enlarged scale, an essential part of a further embodiment of a fastener according to the invention.

Furthermore, as shown in FIG. 2, it is further preferable when the outside diameter of the insulator layer 5 is larger (larger by, for example, 1.0 mm) than the outside diameter D1 of the flush head 3.

Thereby, a lightning stroke current tending to flow toward the fastener body 4 is interrupted (decreased) by the insulator layer 5, so that it is possible to prevent (decrease) conduction of the lightning stroke current to the CFRP 12, thus enabling preventing the lightning stroke current from doing damage to the CFRP 12.

Furthermore, as shown in FIG. 2, it is further preferable when a second insulator layer 5a is provided circumferentially on a peripheral edge of the flush head 3 positioned radially outward.

Thereby, it is possible to prevent (decrease) flow of electric current due to secondary electric discharge of thunderbolt.

Furthermore, it is also possible to wet-install the shank 2 with the use of a conductive compound. Thereby, it is possible to make sure contact between the shank 2 and the CFRP 12, thus enabling further lowering the fastener in electric potential at the time of lightning stroke (at the time of thunderbolt).

Figure 3:
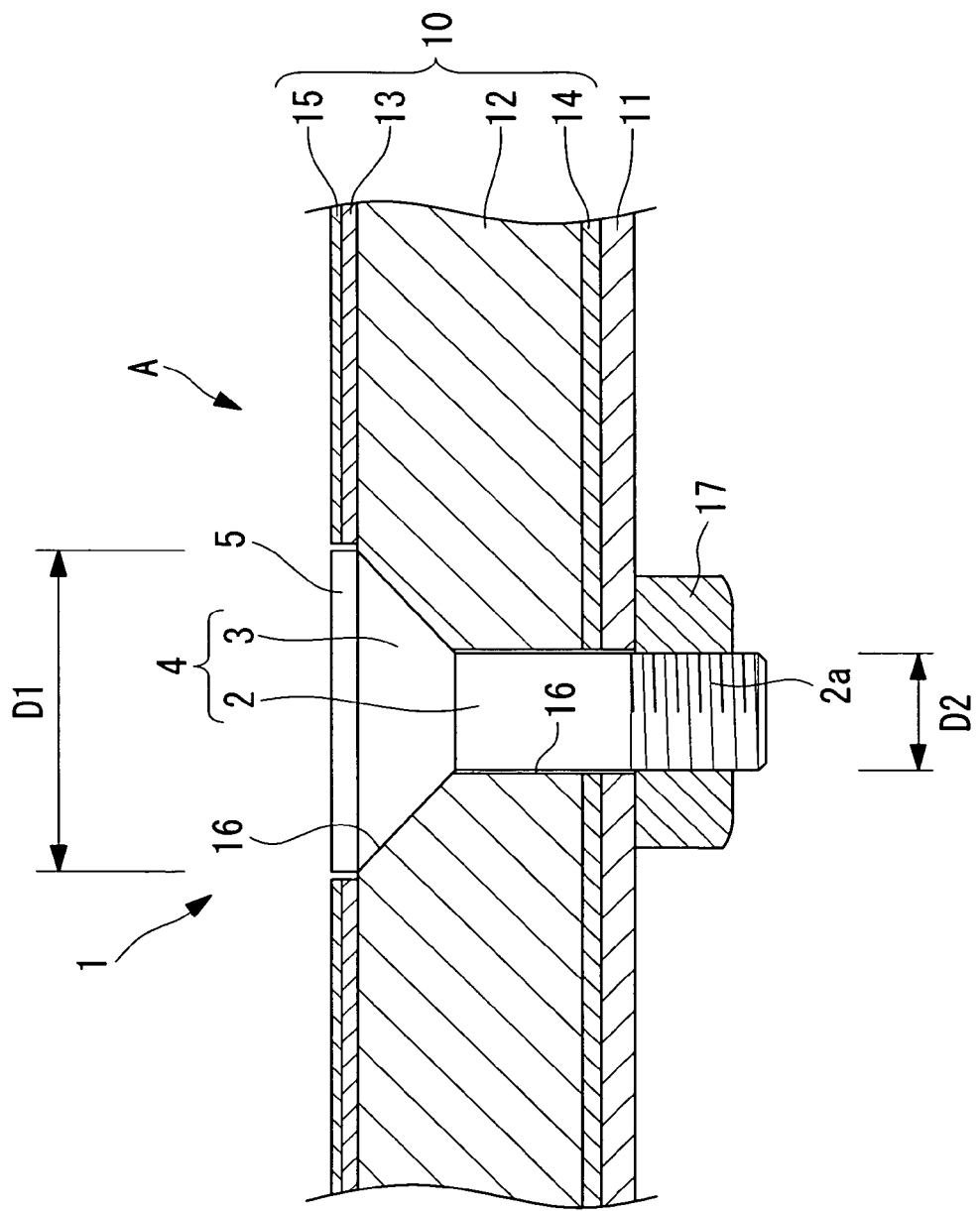
FIG. 3 is a view showing a further embodiment of a fastener according to the invention and a longitudinal, cross sectional view showing an airplane assembly in a state, in which a skin and a structural material are joined by the fastener.

Furthermore, as shown in FIG. 3, it is further preferable when the insulator layer 5 is formed (the insulator layer 5 is set in thickness) so that the surface of the insulator layer 5 and the surface of the conductive mesh 15 are put in a substantially flush (or flush) state.

Thereby, it is possible to put the surface of the skin 10 after coating in a further flush state, thus enabling achieving a further decrease in aerodynamic drag.

Figure 4:
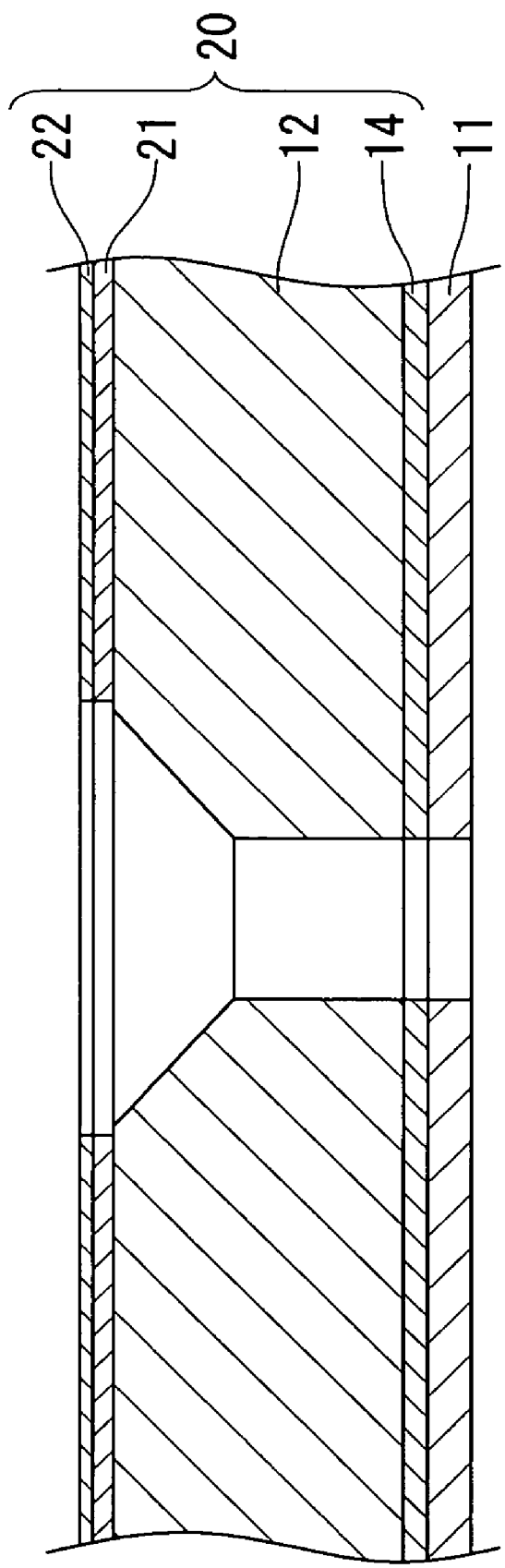
FIG. 4 is a longitudinal, cross sectional view showing a skin of an airplane, to which a fastener according to the invention can be applied.

Furthermore, the fastener according to the invention is not used only to join the skin 10 of an airplane shown in FIG. 1 and the structural material (for example, rib, stringer, or the like) 11 but can be used to join, for example, a skin 20 of an airplane shown in FIG. 4 and the structural material 11.

The skin 20 is mainly made of a resin material (for example, CFRP (carbon fiber reinforced resin) referred below to as "CFRP") 12 having conductivity (conductivity in the order of 1/100 to 1/1000 times that of aluminum), a member (made of, for example, copper) 21 being conductive is laminated on a surface (surface positioned outside after assembling) of the skin, and a resin material (for example, GFRP (glass fiber reinforced resin) referred below to as "GFRP") 14 having an insulating property is laminated on a whole back surface (surface positioned inside after assembling) of the skin.

Also, a resin material (for example, GFRP (glass fiber reinforced resin)) 22 having an insulating property is laminated on a whole surface of the member 21 being conductive and positioned on a front surface of the CFRP 12.

The invention claimed is:

1. An airplane assembly, comprising:
a skin which includes
a resin material having conductivity, and
a member having conductivity laminated outside the resin material;
a structural material positioned inside the skin so as to support the skin; and
a fastener which joins the skin to the structural material, the fastener including a columnar-shaped shank,
a fastener head arranged at one end of the shank,
a first insulator layer arranged so as to cover an end surface of the fastener head, and
a second insulator layer arranged circumferentially on a radially outer peripheral surface of the fastener head so as to surround the fastener head, wherein the end surface of the fastener head and the radially outer peripheral surface of the fastener head are insulated from the member having conductivity, and wherein the second insulator layer extends inside the member having conductivity.

2. An airplane assembly according to claim 1, wherein the first insulator layer is an insulating material that exhibits 100 kV/mm or more in terms of a value of dielectric breakdown voltage.

3. An airplane assembly according to claim 2, wherein the insulating material comprises one of biaxial oriented polyethylene terephthalate film, polyimide film, biaxial oriented polyethylene naphthalate film, polyphenylene sulfide film, and biaxial oriented polypropylene film.

4. An airplane assembly according to claim 1, wherein the first insulator layer is fixed to the fastener head through an adhesive.

5. An airplane assembly according to claim 1, wherein the first insulator layer is formed by thermal spraying or a coating baking method.

6. An airplane assembly according to claim 1, wherein the member having conductivity is made of a metal.

7. An airplane assembly according to claim 6, wherein the member having conductivity is a copper plate.

8. An airplane assembly according to claim 6, wherein the member having conductivity is a copper mesh.

9. An airplane assembly according to claim 1, further comprising:
an insulating layer between the member having conductivity and the resin material having conductivity.

10. An airplane assembly according to claim 1, wherein the member having conductivity extends in a circumferential direction of the first insulator layer.

11. An airplane assembly according to claim 1, wherein the member having conductivity is laminated so as not to cover the first insulator layer.

12. An airplane assembly according to claim 1, wherein the second insulator layer is in direct contact with the first insulator layer.

13. An airplane assembly according to claim 1, wherein the first insulator layer has a thickness of 0.075-1.0 mm.

14. An airplane assembly according to claim 1, wherein a length of the second insulator layer in an axial direction of the fastener is greater than a thickness of the member having conductivity.

15. An airplane assembly according to claim 1, wherein the fastener is arranged such that an outer surface of the first insulator layer is flush with an outermost surface of the skin.

16. An airplane assembly according to claim 15, wherein the fastener is arranged such that the end surface of the fastener head is flush with an outer surface of the resin material, and wherein the outer surface of the first insulator layer is flush with an outer surface of the member having conductivity.

17. A fastener for joining a skin of an airplane to a structural material positioned inside the skin, comprising:
a columnar-shaped shank;
a fastener head arranged at one end of the shank;
a first insulator layer arranged so as to cover only one end surface of the fastener head; and
a second insulator layer arranged circumferentially on a radially outer peripheral surface of the fastener head, wherein the first insulator layer is a disk-shaped member having an outer diameter substantially equal to an outer diameter of the fastener head, and wherein the first insulator layer is formed by thermal spraying or a coating baking method.

18. A fastener for joining a skin of an airplane to a structural material positioned inside the skin, comprising:
a columnar-shaped shank;
a fastener head arranged at one end of the shank;
a first insulator layer arranged so as to cover only one end surface of the fastener head; and
a second insulator layer arranged circumferentially on a radially outer peripheral surface of the fastener head,
wherein the first insulator layer is a disk-shaped member having an outer diameter substantially equal to an outer diameter of the fastener head,
wherein the first insulator layer is an insulating material that exhibits 100 kV/mm or more in terms of a value of dielectric breakdown voltage, and
wherein the insulating material comprises one of biaxial oriented polyethylene terephthalate film, polyimide film, biaxial oriented polyethylene naphthalate film, polyphenylene sulfide film, and biaxial oriented polypropylene film.

* * * * *